United States Patent
Topps et al.

[11] Patent Number: 6,164,213
[45] Date of Patent: Dec. 26, 2000

[54] LAPTOP COMPUTER WORK STATION AND ACCESSORY STORAGE SYSTEM

[76] Inventors: Chris Topps, 32651 Deadwood Dr., San Juan Capistrano, Calif. 92675; Vance Topps, 4070 Drew Ter., Fremont, Calif. 94538

[21] Appl. No.: 09/461,942

[22] Filed: Dec. 15, 1999

[51] Int. Cl.[7] .................................................. A47B 23/00
[52] U.S. Cl. ................................ 108/43; 108/44; 108/25
[58] Field of Search ............................... 108/43, 25, 44, 108/45; 248/918

[56] References Cited

U.S. PATENT DOCUMENTS

| | | | |
|---|---|---|---|
| 4,619,386 | 10/1986 | Richardson | 108/44 X |
| 4,765,583 | 8/1988 | Tenner | 108/43 X |
| 4,852,498 | 8/1989 | Judd . | |
| 5,263,423 | 11/1993 | Anderson | 108/43 |
| 5,460,102 | 10/1995 | Pasmanick | 108/43 |
| 5,542,637 | 8/1996 | Schriner . | |
| 5,595,428 | 1/1997 | Huang | 108/26 X |
| 5,623,869 | 4/1997 | Moss et al. . | |
| 5,680,973 | 10/1997 | Vulpitta et al. | 108/43 X |
| 5,692,815 | 12/1997 | Murphy . | |
| 5,732,910 | 3/1998 | Martin . | |
| 5,871,094 | 2/1999 | Leibowitz . | |
| 5,893,540 | 4/1999 | Scott . | |
| 5,911,397 | 6/1999 | Jokinen et al. . | |
| 5,966,285 | 10/1999 | Sellers | 108/44 X |
| 5,971,148 | 10/1999 | Jackson | 108/43 X |
| 5,979,337 | 11/1999 | Clark et al. | 108/43 |

*Primary Examiner*—Jose V. Chen
*Attorney, Agent, or Firm*—Emery L. Tracy

[57] ABSTRACT

A work station and storage assembly for supporting a laptop computer above a work surface is provided. The work station and storage assembly comprises a platform having a computer supporting surface with the computer supporting surface being angled relative to the work surface. At least one storage cavity is formed in the platform between the computer supporting surface and the work surface. A mechanism releasably secures the laptop computer to the computer supporting surface of the platform.

18 Claims, 4 Drawing Sheets

LAPTOP COMPUTER WORK STATION AND ACCESSORY STORAGE SYSTEM

BACKGROUND OF THE INVENTION

1. Field of the Invention

This invention relates generally to a work station for a laptop computer and, more particularly, it relates to laptop computer work station having an accessory storage area for storing various laptop computer accessories and the like.

2. Description of the Prior Art

The use of and advantages associated with portable computers are well known in the art. Over the last decade, there has been an intense effort in the computer industry to down size the personal computer ("PC") to provide users with a powerful yet portable computer that can be taken out of the office and fully used at home or on the road. As advancements have been made in both microprocessing chip and battery technologies, particularly over the last decade, PCs were eventually downsized into "laptop computers". While these computers offered the portability and processing power of a full sized PC, the laptop computer was still somewhat large and heavy for the user to carry around. In response to these disadvantages, the laptop computers were downsized even further into what is now commonly known in the industry as a notebook computer, which is smaller and more light weight yet possessing equal or greater processing capabilities than their earlier laptop counterpart.

Many users of current notebook or laptop computers enjoy the inherent portability advantages of the computer by bringing the laptop computer on business and other traveling trips. As a result, laptop computer users are often required to use the laptop computer directly on their laps or an adjacent table or desk. Unfortunately, many items needed by the user while using the laptop computer, e.g., CD ROM's, floppy disks, notepads, writing instruments, etc., are often left in the office or home of the user thereby creating a great inconvenience to the user. Or, in the alternative, the user is required to carry these items in a bag or case separate from the laptop computer thereby creating additional inconveniences for the user by increasing the number of items which must be carried by the user.

Additionally, due to the design of the laptop computers, laptop computers often require the user to assume uncomfortable and unhealthy positions for extended periods of time during use of the laptop computer. For instance, the keyboard on the laptop computer is often positioned within the laptop computer such that the keyboard is situated substantially parallel to the surface upon which the laptop is positioned. Furthermore, the hands of the user during use of the laptop computer are required to rest upon the hard, plastic main outer casing of the laptop computer for extended periods of time thereby creating an additional discomfort for the hands of the user while using the laptop computer for extended periods of time.

Accordingly, there exists a need for a laptop computer work station and accessory storage system which provides at least one storage area adjacent the laptop computer for storing desired laptop computer accessories and the like. Additionally, a need exists for a laptop computer work station and accessory storage system which positions the keyboard of the laptop at an appropriate and ergonomically correct angle for providing a comfortable and healthy benefit for the user. Furthermore, there exists a need for a laptop computer work station and accessory storage system which provides an ergonomic pad directly under the user's hands while using of the laptop computer for added comfort to the user.

SUMMARY

The present invention is a work station and storage assembly for supporting a laptop computer above a work surface. The work station and storage assembly comprises a platform having a computer supporting surface with the computer supporting surface being angled relative to the work surface. At least one storage cavity is formed in the platform between the computer supporting surface and the work surface. A mechanism releasably secures the laptop computer to the computer supporting surface of the platform.

The present invention further includes a method for supporting a laptop computer above a work surface. The method comprises providing a platform having a computer supporting surface, angling the computer supporting surface relative to the work surface, forming at least one storage cavity in the platform between the computer supporting surface and the work surface, and releasably securing the laptop computer to the computer supporting surface of the platform.

DETAILED DESCRIPTION OF THE PREFERRED EMBODIMENTS

Figure 1:
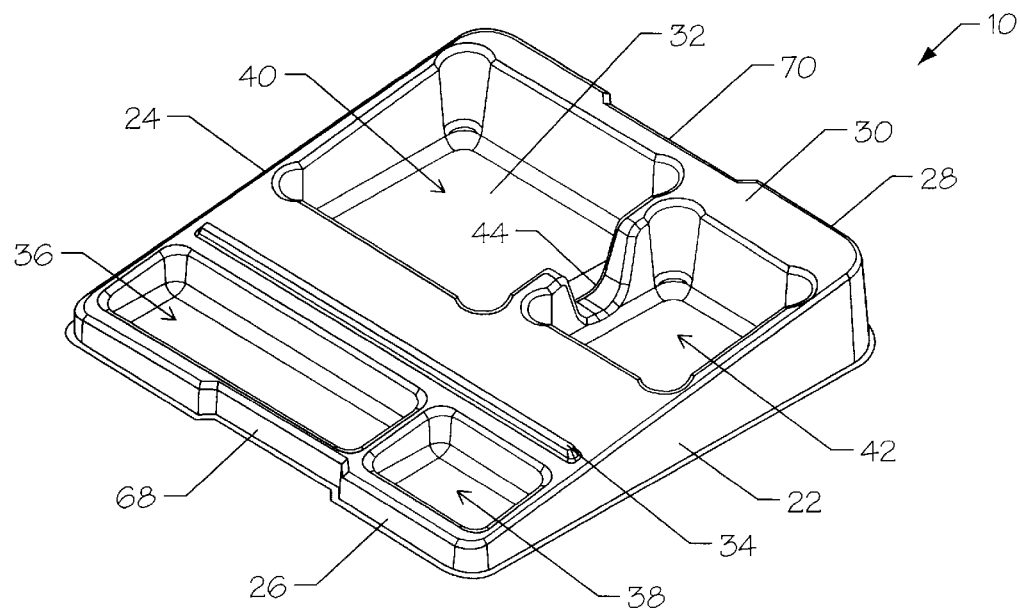
FIG. 1 is a perspective view illustrating a laptop computer work station and accessory storage system, constructed in accordance with the present invention.
Figure 4:
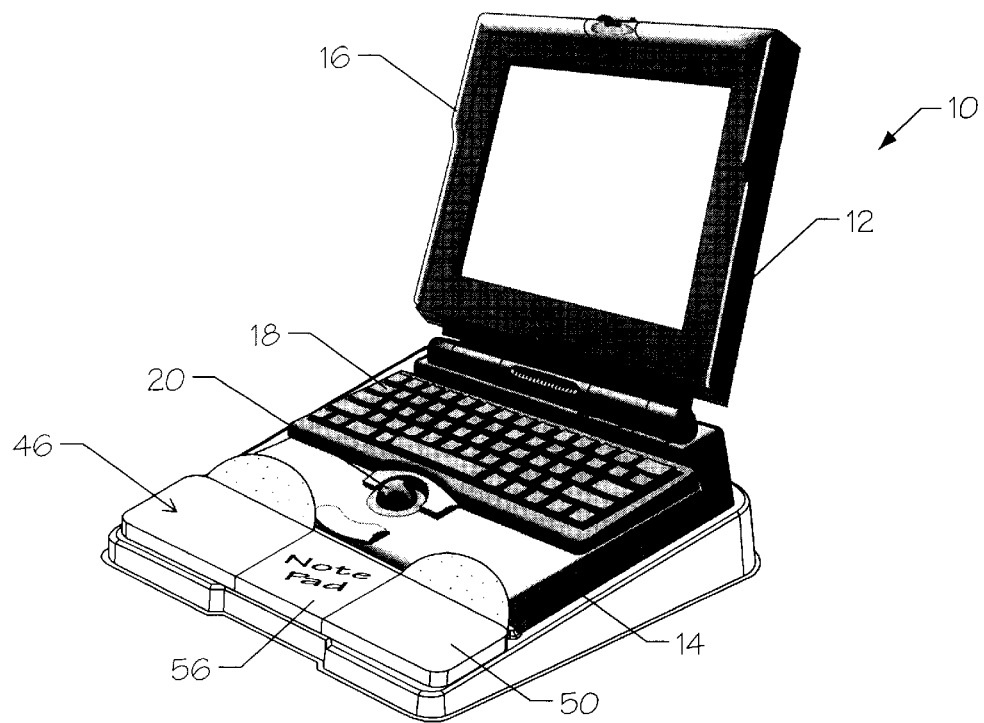
FIG. 4 is yet another perspective view illustrating the laptop computer work station and accessory storage system as illustrated in FIG. 3, constructed in accordance with the present invention, with a laptop computer being positioned upon the work station and accessory storage system.

As illustrated in FIG. 1, the present invention is a laptop computer work station and accessory storage system, indicated generally at 10, for receiving a laptop computer 12 and for storing of various desired laptop computer accessories (not shown) and the like therein. As illustrated in FIG. 4, the laptop computer 12 typically includes a main outer casing 14 and a liquid crystal display screen 16 pivotally connected to the main outer casing 14. The main outer casing 14 includes a keyboard 18, a touch pad 20, and a variety of peripheral devices (not shown) including, but not limited to, a hard disk drive, a floppy disk drive, a CD ROM drive, etc. Furthermore, the main outer casing 14 includes a plurality of apertures (not shown) on each side of the touch pad for allowing sound to be emitted from speakers (not shown) mounted within the laptop computer 12. While a specific type of laptop computer 12 has been described heretofore and will be described hereinafter, a person skilled in the art will understand that it is within the scope of the present invention to utilize any type of laptop computer 12 with the system 10 of the present invention.

The system 10 includes a first side wall 22, a second side wall 24 substantially opposite the first side wall 22, a front wall 26 between the first side wall 22 and the second side wall 24, a back wall 28 substantially opposite the front wall 26, a top computer supporting surface 30, and a bottom surface 32 substantially opposite the top computer supporting surface 30. Preferably, the back wall 28 has a height greater than the height of the front wall 26 thereby sloping the top computer supporting surface 30 at an angle of approximately eleven (11°) degrees although a top computer supporting surface 30 having an angle greater than or less than approximately eleven (11°) degrees is within the scope of the present invention. With the top computer supporting surface 30 having an ergonomically correct slope angle, the keyboard 18 of the laptop computer 12 will ergonomically slope toward the user thereby providing additional comfort and health benefits for the user, especially over extended periods of time. Furthermore, a bridge or ridge 34 is formed on the top computer supporting surface 30 to inhibit the laptop computer 12 from sliding relative to the sloped top computer supporting surface 30 in direction generally toward the user and off the system 10.

The system 10 further includes at least one storage cavity formed in the top computer supporting surface 30 for receiving various desired accessories associated with the laptop computer 12. In a preferred embodiment, the system 10 includes four storage cavities, namely a first storage cavity 36 and a second storage cavity 38 near and adjacent the front wall 26, and a third storage cavity 40 and a fourth storage cavity 42 near and adjacent the back wall 28. Each of the storage cavities 36,38, 40, 42 can be sized and shaped differently from each other storage cavity, or each of the storage cavities 36, 38, 40, 42 can be sized and shaped the same as each other storage cavity. The laptop computer accessories capable of being stored within the system 10 include, but are not limited to, CD-ROM's, floppy disks, note pads, writing instruments, etc. A finger well 44 can be formed between the third storage cavity 40 and the fourth storage cavity 42 for promoting easy access for the removal of certain hard-to-access accessories from the third storage cavity 40 and/or the fourth storage cavity 42.

Figure 2:
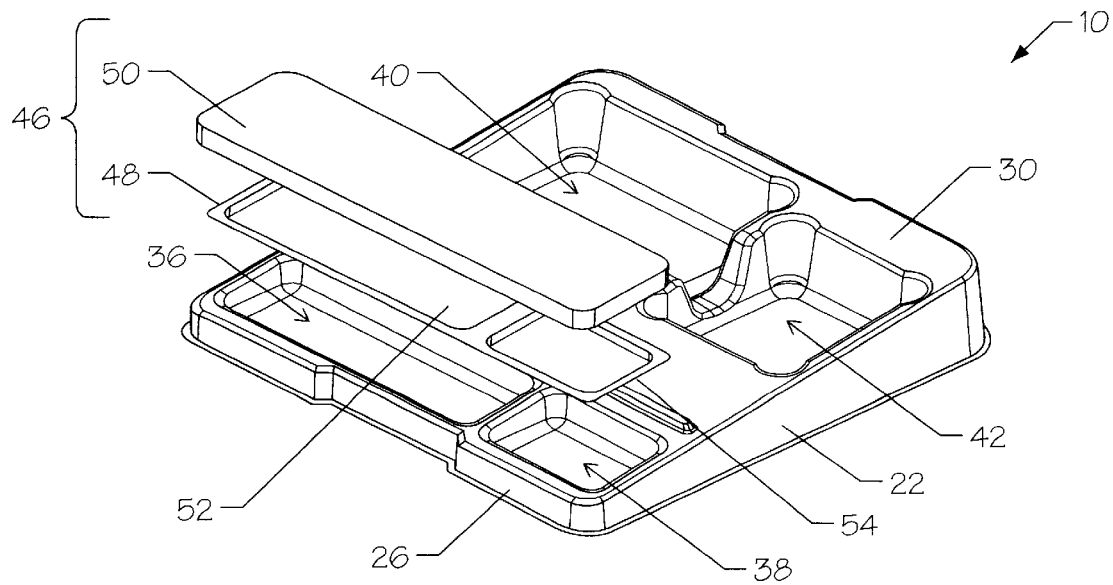
FIG. 2 is another perspective view illustrating the laptop computer work station and accessory storage system as illustrated in FIG. 1, constructed in accordance with the present invention, with an ergonomic pad lid assembly for covering at least one of the storage areas.

As illustrated in FIG. 2, the system 10 also includes an ergonomic pad lid assembly 46 having a lid portion 48 and an ergonomic pad portion 50. The lid portion 48 of the ergonomic pad lid assembly 46 has a top surface 52 and a bottom surface 54 for covering the first storage cavity 36 and the second storage cavity 38. The lid portion 48 is releasably securable within the first storage cavity 36 and the second storage cavity 38 in a press fit manner. Additional mechanisms (not shown) can be added to the lid portion 48 or within the first storage cavity 36 and/or second storage cavity 38 to facilitate releasably securing the lid portion 48 within the first storage cavity 36 and the second storage cavity 38.

The ergonomic pad portion 50 of the ergonomic pad lid assembly 46 is secured to the top surface 52 of the lid portion 48 by a fastening mechanism such as an adhesive or the like. Part 58 of the ergonomic pad portion 50 can be removed to allow a note pad 56 or the like to be secured to the top surface 52 of the lid portion 48. In a preferred embodiment, the ergonomic pad portion 50 for a laptop computer 12 has a length of approximately eleven (11") inches and a width of approximately three (3") inches and the removed part 58 of the ergonomic pad portion 50 is sized and shaped to receive a standard three (3") inch by three (3") inch Post-It® note pad 56 manufactured by 3M Corporation, St. Paul, Minn. For a desktop computer (not shown), the ergonomic pad portion 50 has a length of approximately eighteen (18") inches and a width of approximately three (3") inches and the removed part 58 of the ergonomic pad portion 50 is sized and shaped to receive a standard three (3") inch by three (3") inch Post-It® note pad 56 manufactured by 3M Corporation, St. Paul, Minn.

The ergonomic pad portion 50 further includes a first pad extension member 60 and a second pad extension member 62 which extend from the ergonomic pad portion 50 and overlie at least a portion of the main outer casing 14 of the laptop computer 12, preferably about each side of the touch pad 20. The first pad extension member 60 and the second pad extension member 62 preferably has a thickness of approximately one-eighth (⅛") inch and provides further comfort for the user during extended periods of using the laptop computer 12. It is within the scope of the present invention, however, for the first pad extension member 60 and the second pad extension member 62 to have a thickness of greater than or less than one-eighth (⅛") inch.

The first pad extension member 60 and the second pad extension member 62 preferably have a substantially semi-circular shape and configuration with a radius of approximately two-and-one-half (2.5") inches thereby extending onto the main outer casing 14 of the laptop computer 12. Furthermore, the first pad extension member 60 and the second pad extension member 62 include a plurality of apertures or perforations 64 extending completely therethrough for allowing sound to travel from the speakers within the laptop computer 12 through the apertures formed in the main outer casing 14 of the laptop computer 12 and through the apertures 64 in the first pad extension member 60 and the second pad extension member 62. Preferably, the first pad extension member 60 and the second pad extension member 62 includes between approximately fifteen (15) and twenty (20) apertures 64 each with each aperture 64 having a diameter of either approximately one-sixteenth (1/16") inch or approximately one-thirty-seconds (1/32") inch.

Figure 3:
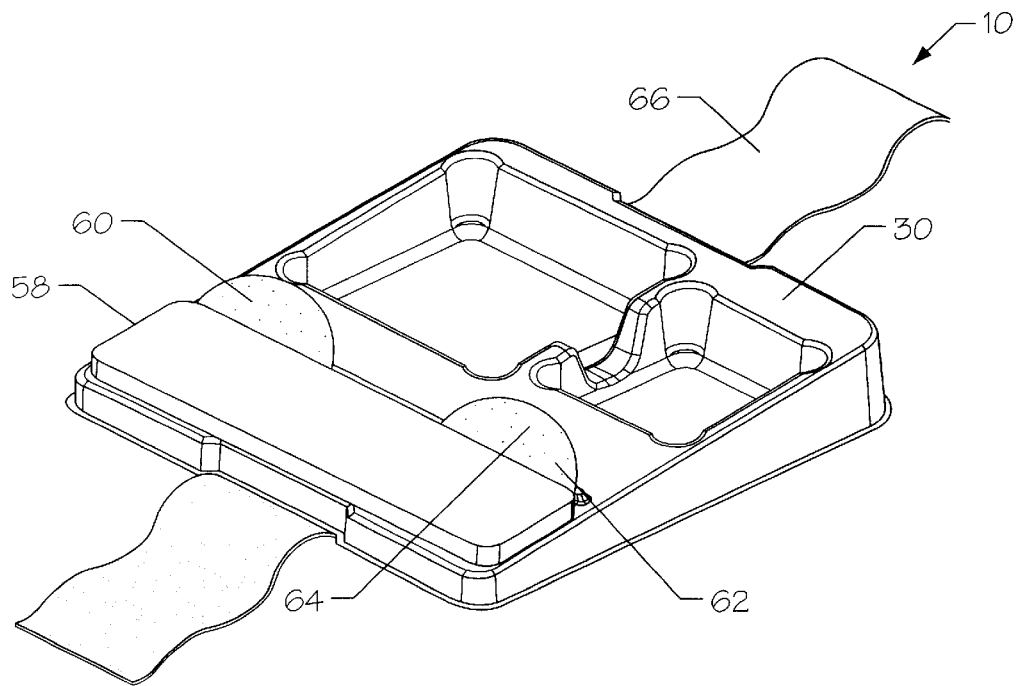
FIG. 3 is still another perspective view illustrating the laptop computer work station and accessory storage system as illustrated in FIG. 2, constructed in accordance with the present invention, with a pair of extended ergonomic perforated pad portions extending over at least a portion of the laptop computer and a strap member for maintaining the laptop computer to the work station and accessory storage system.
Figure 5:
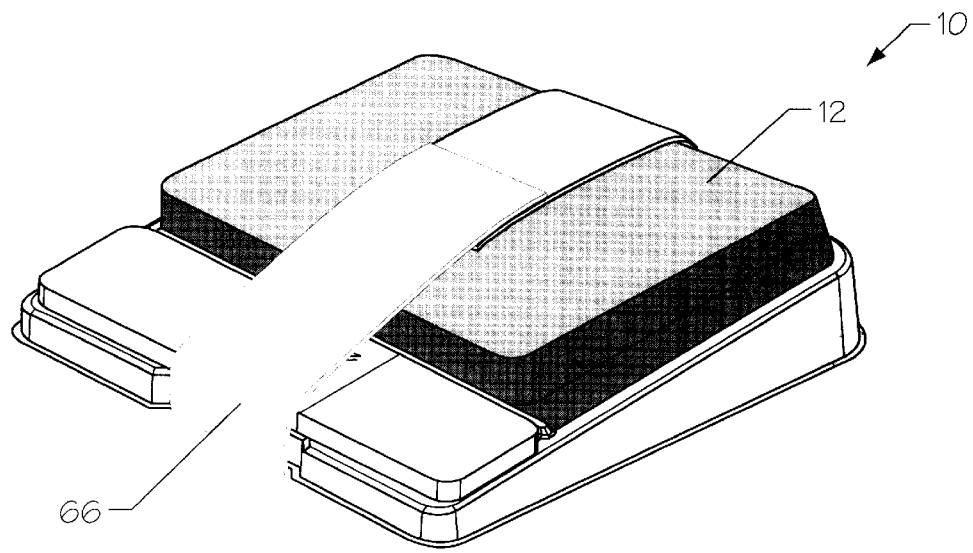
FIG. 5 is still yet another perspective view illustrating the laptop computer work station and accessory storage system as illustrated in FIG. 4, constructed in accordance with the present invention, with the laptop computer being releasably secured to the work station and accessory storage system by the strap member.

As illustrated in FIGS. 3 and 5, the system 10 additionally includes a strap member 66 for releasably maintaining the laptop computer 12 to the system 10 during non-use and/or transport of the laptop computer 12. Preferably, the strap member 66 has a width of approximately three (3") inches although a strap member 66 having a width greater than or less than approximately three (3") inches is within the scope of the present invention. Furthermore, preferably, the strap member 66 is an elastic strap member although other types of strap members 66 are within the scope of the present invention.

Preferably, the system 10 includes a first recessed portion 68 in the front wall 26, a second recessed portion 70 in the back wall 28, and a third recessed portion 72 in the bottom surface 32 for receiving the strap member 66. As illustrated in FIG. 5, with the laptop computer 12 positioned on the top computer supporting surface 30, the strap member 66 is positioned within the first recessed portion 68, the second recessed portion 70, and the third recessed portion 72, about and overlying the laptop computer 12, and securing to itself with a hook and loop fastener or the like. As previously discussed, the strap member 66 securely holds the laptop computer 12 to the system 10 during non-use and/or transport of the laptop computer 12.

Figure 6:
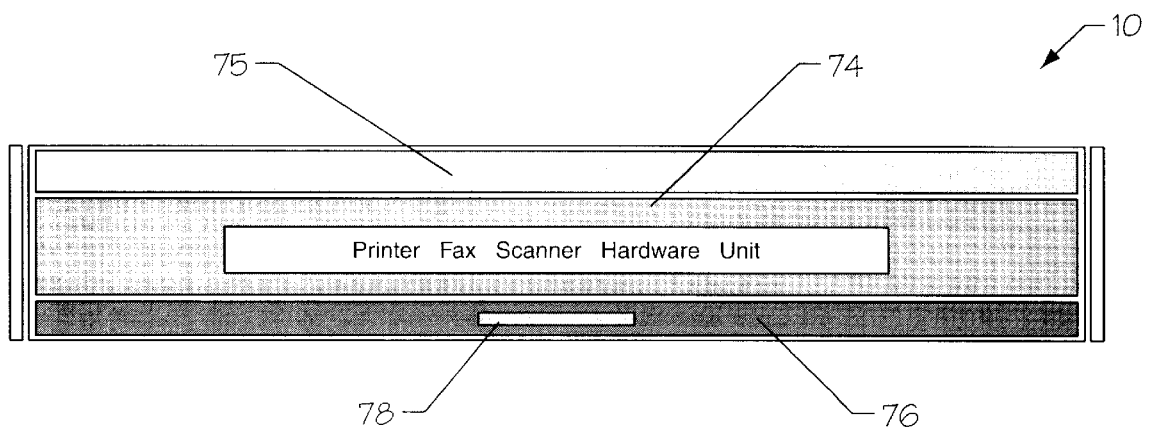
FIG. 6 is a rear view illustrating the laptop computer work station and accessory storage system, constructed in accordance with the present invention, with a printer/fax/scanner hardware unit and paper tray being positioned within the work station and accessory storage system.

As illustrated in FIG. 6, in another embodiment of the present invention, the system 10 includes a printer/fax/ scanner hardware unit 74 instead of the third storage cavity 40 and the fourth storage cavity 42. The hardware unit 74 allows a user to print, fax, and/or scan documents directly from the laptop computer 12 without the requirement of additional external hardware. A paper tray 76 associated with the hardware unit 74 holds a predetermined number of sheets of paper, e.g., twenty-four (24) sheets, for use with the hardware unit 74. The hardware unit 74 draws paper-, as needed, from the paper tray 76 and the printed documents exit the hardware unit 74 via a paper exit port 75. A handle 78 can be provided on the paper tray 76 for facilitating loading of additional paper therein. Furthermore, appropriate software and hardware can be added to the laptop computer 12 to allow the user to directly utilize the hardware unit 74.

Figure 7:
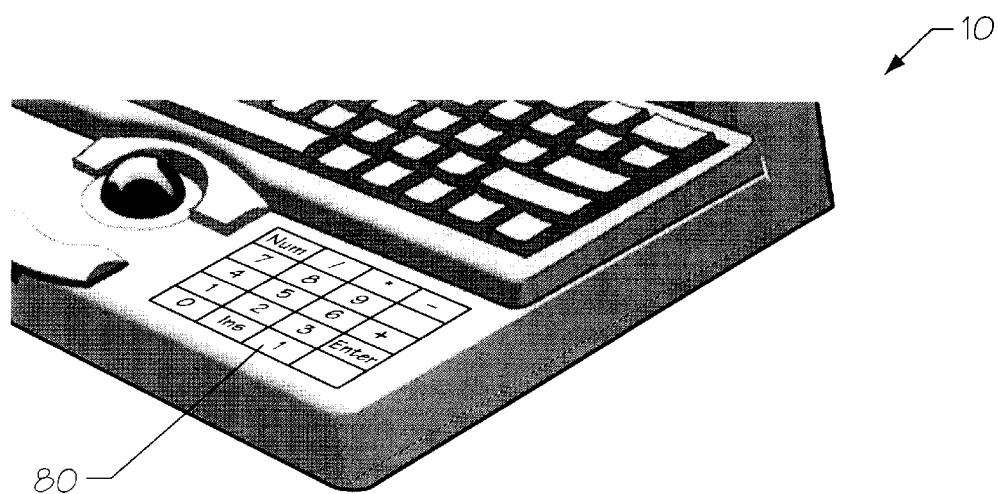
FIG. 7 is a top view illustrating a laptop computer, constructed in accordance with the present invention, having a ten key punch formed in the outer casing of the laptop computer.

As illustrated in FIG. 7, in still another embodiment of the present invention, the laptop computer 12 includes a ten key pad 80 in the main outer casing of the laptop computer adjacent the touch pad 20 and the keyboard 18. Appropriate software and hardware can be added to the laptop computer 12 to allow the user to use the ten key pad 80 such as commonly found in desktop keyboards.

The system 10 of the present invention is preferably formed from a plastic material through a thermoformed process. In a preferred embodiment, the plastic material is an eighty-five (85) mil PVC material. While the system 10 has been described as being formed from a plastic material through a thermoformed process, it is within the scope of the present invention to form the system 10 from a different material other than a plastic material through any type of process other than a thermoformed process.

The system 10 of the present invention provides a unique and innovative way to use and/or carry a laptop computer 12. The system 10 provides ample storage areas for accessories and ergonomic support during use of the laptop computer 12.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

What is claimed is:

1. A work station and storage assembly for supporting a laptop computer above a work surface, the work station and storage assembly comprising:
   a platform having a computer supporting surface, the computer supporting surface being angled relative to the work surface;
   at least one storage cavity formed in the platform between the computer supporting surface and the work surface;
   means for releasably securing the laptop computer to the computer supporting surface of the platform;
   a front side and a back side supporting the top surface, the front side having a first recessed portion and a back side having a second recessed portion; and
   a bottom surface for contacting the work surface;
   wherein the means for releasably securing includes a strap member positionable within the first recessed portion and the second recessed portion.

2. The work station and storage assembly of claim 1 wherein the angle between the computer supporting surface and the work surface is between approximately ten (10°) degrees and approximately fifteen (15°) degrees.

3. The work station and storage assembly of claim 1 and further comprising means for inhibiting the laptop computer from sliding relative to the computer supporting surface.

4. The work station and storage assembly of claim 1 and further comprising four storage cavities.

5. The work station and storage assembly of claim 1 and further comprising fastening means for releasably maintaining the strap member about the laptop computer.

6. The work station and storage assembly of claim 1 and further comprising an ergonomic pad releasably secured to the computer supporting surface of the platform.

7. The work station and storage assembly of claim 6 and further comprising pad portion means extending from the ergonomic pad for overlying at least a portion of the laptop computer.

8. The work station and storage assembly of claim 7 and further comprising at least one aperture formed in the pad portion means.

9. The work station and storage assembly of claim 7 wherein the pad portion means includes a first pad and a second pad, the first pad spaced from the second pad.

10. The work station and storage assembly of claim 6 and further comprising a recessed area formed in the ergonomic pad for receiving a note pad.

11. The work station and storage assembly of claim 1 and further comprising a printer/fax/scanner hardware unit positioned within the platform and communicating with the laptop computer.

12. The work station and storage assembly of claim 1 wherein the laptop computer includes a ten key punch pad adjacent a keyboard on the laptop computer.

13. A method for supporting a laptop computer above a work surface, the method comprising:
   providing a platform having a computer supporting surface;
   angling the computer supporting surface relative to the work surface;
   forming at least one storage cavity in the platform between the computer supporting surface and the work surface;
   supporting the computer supporting surface with a front side and a back side;
   forming a first recessed portion in the front side;
   forming a second recessed portion in the back side;
   positioning a strap member within the first recessed portion and the second recessed portion; and
   releasably securing the laptop computer to the computer supporting surface of the platform.

14. The method of claim 13 and further comprising inhibiting the laptop computer from sliding relative to the computer supporting surface.

15. The method of claim 13 and further comprising fastening means for releasably maintaining the strap member about the laptop computer.

16. The method of claim 13 and further comprising releasably securing an ergonomic pad to the computer supporting surface of the platform.

17. The method of claim 16 and further comprising extending at least one pad portion from the ergonomic pad and over at least a portion of the laptop computer.

18. The method of claim 17 and further comprising forming at least one aperture in the pad portion.

* * * * *